Patented Oct. 6, 1925.

1,556,543

UNITED STATES PATENT OFFICE.

UMBERTO POMILIO AND FRANCESCO GIORDANI, OF NAPLES, ITALY, ASSIGNORS TO POMILIO BROTHERS CORPORATION, OF NEW YORK, N. Y., A CORPORATION OF NEW YORK.

ELECTROLYTIC PROCESS FOR TREATING SOLUTIONS DERIVED FROM LEUCITIC ROCKS.

No Drawing. Application filed August 25, 1922. Serial No. 584,385.

*To all whom it may concern:*

Be it known that we, UMBERTO POMILIO and FRANCESCO GIORDANI, subjects of the King of Italy, residing at Naples, in the Province of Naples and Kingdom of Italy, have invented certain new and useful Improvements in Electrolytic Processes for Treating Solutions Derived from Leucitic Rocks, of which the following is a specification.

Methods are known for the complete utilization of the constituent elements of leucitic and similar rocks such methods being intended to obtain compounds of these elements in the pure state as necessary for immediate use in important industrial applications.

In another application No. 584,386 of even date herewith a process is pointed out for this purpose consisting in attacking the previously enriched mineral with acid in slight defect as compared with the calculated amount, so that the dissolved impurities would be reduced and then separating, through fractional crystallization, iron chloride from less soluble potassium and aluminum chloride into hydroxide.

The present invention considers the most general case of attacking the rock with hydrochloric, or other acids and differs from the co-pending application in that the iron is removed from the solution by electrolysis, the aluminum being then precipitated by an alkali in the form of aluminum hydroxide.

The liquor resulting from acid treatment of the mineral and containing the salts corresponding to the acids used is first neutralized for precipitation of silica, and thereafter electrolyzed by means of an iron cathode and a convenient anode (graphite for chlorides, lead for sulphates, etc.), the temperature and the current density being preferably kept at the best values for the deposition of iron.

Once free from iron, the electrolyte is treated with lime, preferably quick lime, so that the heat of hydration of the lime may warm up the solution. Under these conditions the alumina in the solution will be completely precipitated. This process is especially adapted for treatment of solutions forming soluble calcium salts.

The liquor remaining after filtering is then subjected to fractional crystallization for the recovery of potassium salts.

Other alkalies, of course when available and convenient, are well adapted for this separation in place of lime viz:

Caustic potash, in small defect, by which process aluminum hydroxide is precipitated and a solution of pure potassium chloride recovered.

Caustic soda, by which process after precipitation and filtration of the alumina, a mixed solution of potassium and sodium salts results. From this mixture each chloride may be recovered by known methods.

Ammonia, by which process, after the recovery of alumina, an admixture of potassium and ammonium chloride results which admixture fills the need for many agricultural necessities.

Various modifications of our invention as described and claimed will be obvious to those skilled in the art and specific terms are used in the specification and claims for the sake of clearness. Such terms are to be understood however as being for definition and not for limitation except as required by the previously known art, and we desire to lay claim distinctly to all equivalent substances, processes and process steps as well as to those named in the claims.

What we claim is:—

1. A process for deriving aluminum from potassium aluminum silicates soluble in hydrochloric acid comprising attacking the silicates with such acid, neutralizing the resulting solution, and then electrolyzing such solution to remove the iron therefrom, substantially as set forth.

2. A process for deriving aluminum from leucitic rocks containing iron comprising attacking them with hydrochloric acid, neutralizing the resulting solution, and then electrolyzing such solution to remove the iron therefrom, substantially as set forth.

3. A process for obtaining aluminum from potassium-aluminum silicates soluble in hydrochloric acid, comprising attacking them with hydrochloric acid, removing the iron from the resulting solution and then treating with lime to precipitate aluminum hydroxide, substantially as set forth.

4. A process for deriving aluminum from potassium aluminum silicates soluble in hydrochloric acid comprising attacking the silicates with such acid, neutralizing the resulting solution, then electrolyzing such solution to remove the iron therefrom, and treating the remaining solution with lime, substantially as set forth.

5. A process for deriving aluminum from potassium aluminum silicates soluble in hydrochloric acid comprising attacking the silicates with such acid, neutralizing the resulting solution, then electrolyzing such solution to remove the iron therefrom, treating the remaining solution with lime, and recovering the potassium salts therefrom by fractional crystallization, substantially as set forth.

6. A process for deriving aluminum from potassium aluminum silicates soluble in hydrochloric acid comprising attacking the silicates with such acid, neutralizing the resulting solution, then electrolyzing such solution to remove the iron therefrom, and treating the remaining solution with an alkali, substantially as set forth.

7. A process for deriving aluminum from potassium aluminum silicates soluble in hydrochloric acid comprising attacking the silicates with such acid, neutralizing the resulting solution, then electrolyzing such solution to remove the iron therefrom, and treating the remaining solution with potassium hydroxide in slight defect to avoid formation of aluminates, substantially as set forth.

8. A process for deriving aluminum from potassium aluminum silicates soluble in hydrochloric acid comprising attacking the silicates with such acid, neutralizing the resulting solution, then electrolyzing such solution to remove the iron therefrom, treating the remaining solution with ammonia, and then removing the precipitated aluminum hydroxide leaving a mixture of ammonium and potassium salts, substantially as set forth.

9. In the recovery of aluminum from a solution containing salts of aluminum and iron the step which comprises electrolyzing a solution with a current of sufficient strength to remove the iron without affecting the aluminum, substantially as set forth.

In witness whereof, we have hereunto set our hands and seals at Naples, Italy, this 15th day of October, A. D. nineteen hundred and twenty one.

UMBERTO POMILIO. [L. S.]
FRANCESCO GIORDANI. [L. S.]